US009093805B2

(12) United States Patent
Pottiez et al.

(10) Patent No.: US 9,093,805 B2
(45) Date of Patent: Jul. 28, 2015

(54) GLOW PLUG CONNECTOR

(71) Applicant: BorgWarner BERU Systems GmbH, Ludwigsburg (DE)

(72) Inventors: Christian Pottiez, Eppingen (DE); Joern Bohnenkamp, Ehningen (DE); Georg Rixecker, Leinfelden-Echterdingen (DE)

(73) Assignee: BorgWarner Ludwigsburg GmbH, Ludwigsbug (DE)

( * ) Notice: Subject to any disclaimer, the term of this patent is extended or adjusted under 35 U.S.C. 154(b) by 0 days.

(21) Appl. No.: 13/765,196

(22) Filed: Feb. 12, 2013

(65) Prior Publication Data

US 2013/0217275 A1  Aug. 22, 2013

(30) Foreign Application Priority Data

Feb. 16, 2012  (DE) .......................... 10 2012 101 232

(51) Int. Cl.
*H01R 24/00* (2011.01)
*H01R 24/28* (2011.01)
*H01R 24/58* (2011.01)
*H01R 39/14* (2006.01)
*G01L 23/22* (2006.01)
*H01R 24/86* (2011.01)
*H01R 105/00* (2006.01)
*H01R 33/76* (2006.01)

(52) U.S. Cl.
CPC ................ *H01R 24/28* (2013.01); *G01L 23/22* (2013.01); *H01R 24/58* (2013.01); *H01R 24/86* (2013.01); *H01R 39/14* (2013.01); *H01R 33/7628* (2013.01); *H01R 2105/00* (2013.01)

(58) Field of Classification Search
CPC ........ H01R 24/38; H01R 24/58; H01R 39/14; H01R 24/86
USPC ................ 439/22, 27, 668, 722, 699.1, 699.2
See application file for complete search history.

(56) References Cited

U.S. PATENT DOCUMENTS

| | | | |
|---|---|---|---|
| 6,607,406 B2 * | 8/2003 | Banas et al. ................. | 439/668 |
| 7,503,807 B2 * | 3/2009 | Martin et al. ................ | 439/668 |
| 7,731,549 B2 | 6/2010 | Metzler et al. | |
| 8,172,427 B2 * | 5/2012 | Hsu ............................ | 439/699.2 |
| 2005/0173395 A1 | 8/2005 | Haussner et al. | |

FOREIGN PATENT DOCUMENTS

| | | |
|---|---|---|
| DE | 2 323 612 A | 11/1974 |
| DE | 10 2004 002 905 B4 | 8/2005 |
| DE | 10 2007 002 942 A1 | 7/2007 |
| DE | 10 2007 031 401 A1 | 1/2009 |
| EP | 2 418 468 A2 | 2/2012 |
| JP | 2008 249 315 A | 10/2008 |

* cited by examiner

*Primary Examiner* — Felix O Figueroa
(74) *Attorney, Agent, or Firm* — Bose McKinney & Evans LLP

(57) ABSTRACT

This disclosure relates to a glow plug connector for a sensor glow plug, comprising a housing made of plastic, a plurality of contact elements made of metal, which form contact surfaces bearing against a circumferential wall of the housing, wherein the contact elements protrude on the glow-plug side from a base of the housing. The contact surfaces are embodied as segments of a circle that protrude from a strip-shaped section of the contact elements. This disclosure also relates to a connector for a cylinder pressure sensor for measuring the pressure in a combustion chamber of an internal combustion engine.

14 Claims, 3 Drawing Sheets

GLOW PLUG CONNECTOR

RELATED APPLICATIONS

This application claims priority to DE 10 2012 101 232.6, filed Feb. 16, 2012 which is hereby incorporated by reference in its entirety.

BACKGROUND

This disclosure relates to a glow plug connector of the type known from DE 10 2004 002 905 B4. Such connectors are mounted on sensor glow plugs to permit simple connection to control devices in a vehicle using a suitable mating connector. Sensor glow plugs are glow plugs that comprise a sensor, for example a sensor for measuring combustion chamber pressure.

Document DE 10 2004 002 905 B4 discloses a glow plug connector, in which the contact elements form contact surfaces in the form of rings arranged concentrically to the longitudinal axis of the connector housing. Document DE 10 2004 002 905 B4 also discloses a glow plug connector, in which the contact elements are formed as sheet-metal strips that extend parallel to one another in the longitudinal direction of the housing and therefore also form contact surfaces in the form of strips extending in the longitudinal direction.

The problem addressed by the present invention is that of demonstrating a less complex way for the sensor of a sensor glow plug to be reliably connected to a control device of a vehicle.

SUMMARY

In a connector according to this disclosure, the contact surfaces of the contact elements, which, in the case of a connector mounted on a glow plug, are connected to the sensor of the glow plug, are embodied as segments of a circle protruding from a strip-shaped section of the contact elements extending in the plug-in direction. The strip-shaped section of the contact elements extending in the plug-in direction therefore extends in the axial direction of the housing. The contact elements may be formed by bending L- or T-shaped sheet-metal strips. The production of contact elements for a connector according to this disclosure is substantially less costly than that of conventional contact elements having annular contact surfaces. Yet, a reliable electrical contact having a suitable mating connecting is made possible, which is substantially better than would be possible using strip-shaped contact elements, which merely comprise contact surfaces extending in the plug-in direction in the shape of strip ends.

According to an advantageous embodiment of this disclosure, in each of the contact elements, the contact surface extends in the circumferential direction across an angular range that does not exceed 180°. This measure has the advantage that the contact elements can be produced using a simple and, therefore, low-cost bending tool since the contact elements, after having been bent, can be easily lifted off of an abutment of a bending tool, for example a mandrel, namely via a motion in the radial direction.

According to a further advantageous refinement of this disclosure, in each of the contact elements, the contact surface extends in the circumferential direction across an angular range of at least 60°. As the angular ranges become smaller, there is an increasing risk that the electrical contact to a mating connector will worsen. Preferably, at least the contact surfaces of some of the contact elements extend across an angular range of at least 90°. For example, the contact surfaces of two contact elements can each cover an angular range of 90° or more, while the contact surface of a third contact element extends only across an angular range of less than 90°, for example 60°.

The contact regions of the individual contact elements may have different sizes. For example, one of the segments of a circle can have a greater width, as measured in the circumferential direction, than one of the other segments of a circle. It is thereby possible to account for the fact that the individual connections of a sensor of a glow plug, for example a signal connection, supply connection and ground connection, can have different requirements on the quality of a contact. For example, the width of the largest segment of a circle, as measured in the circumferential direction, may be larger by one-third, e.g. by at least half, than the width of the smallest segment of a circle as measured in the circumferential direction. Such an embodiment can be advantageous in particular when the individual contact surfaces are all disposed at the same distance from the base of the connector housing.

If the length of the connector housing is less significant, for example because sufficient installation space is available in the vehicle, the contact surfaces can also be disposed at different distances from the base of the housing. In this case in particular, it is usually advantageous when the individual contact surfaces cover identical angular ranges.

According to an advantageous refinement of this disclosure, the contact elements that form contact surfaces adjacent to the circumferential wall of the housing are embedded into a circumferential wall of the plastic housing, e.g. by insert injection moulding. Since each of the contact surfaces is formed as a segment of a circle, it is possible to attain therebetween—given the same size of connector—a larger spatial distance between the individual contact elements than would be possible with conventional annular contact surfaces. The contact elements for a connector according to this disclosure can be advantageously processed as inserts during plastic injection molding of the housing.

According to a further advantageous development of this disclosure, exactly three contact elements form the contact surfaces bearing against the circumferential wall of the housing. Advantageously, it is thereby possible to connect a signal contact, a ground contact and a supply contact of a sensor. However, sensors can also be connected with only two contacts to a control device of a vehicle.

This disclosure also relates to a sensor glow plug, that is, a glow plug having an installed sensor, for example for measuring combustion chamber pressure, wherein a glow plug connector according to this disclosure is mounted on the sensor glow plug. The contact elements protruding from the base of the connector housing are then connected to leads of a sensor of the sensor glow plug, preferably in a bonded manner, for example by welding. Further possibilities for connecting the contact elements protruding from the base of the connector housing to leads of a sensor of the sensor glow plug are pressing or crimping, for example.

The advantages of the present invention can also be utilized for a cylinder pressure sensor, for example in a spark-ignition engine. This disclosure therefore also relates to a connector for a cylinder pressure sensor for measuring the pressure in a combustion chamber of an internal combustion engine, comprising a housing made of plastic, a plurality of contact elements made of metal, which form contact surfaces that bear against a circumferential wall of the housing, wherein the contact elements protrude on the sensor side from a base of the housing, and the contact surfaces are embodied as segments of a circle, which protrude in circumferential direction from a strip-shaped section of the contact elements.

BRIEF DESCRIPTION OF THE DRAWINGS

Further details and advantages of this disclosure are explained using embodiments, with reference to the attached drawings. Components that are identical or similar are labeled using the same reference numerals.

DETAILED DESCRIPTION

The embodiments described below are not intended to be exhaustive or to limit this disclosure to the precise forms disclosed in the following detailed description. Rather, the embodiments are chosen and described so that others skilled in the art may appreciate and understand the principles and practices of the present invention.

Figure 1:
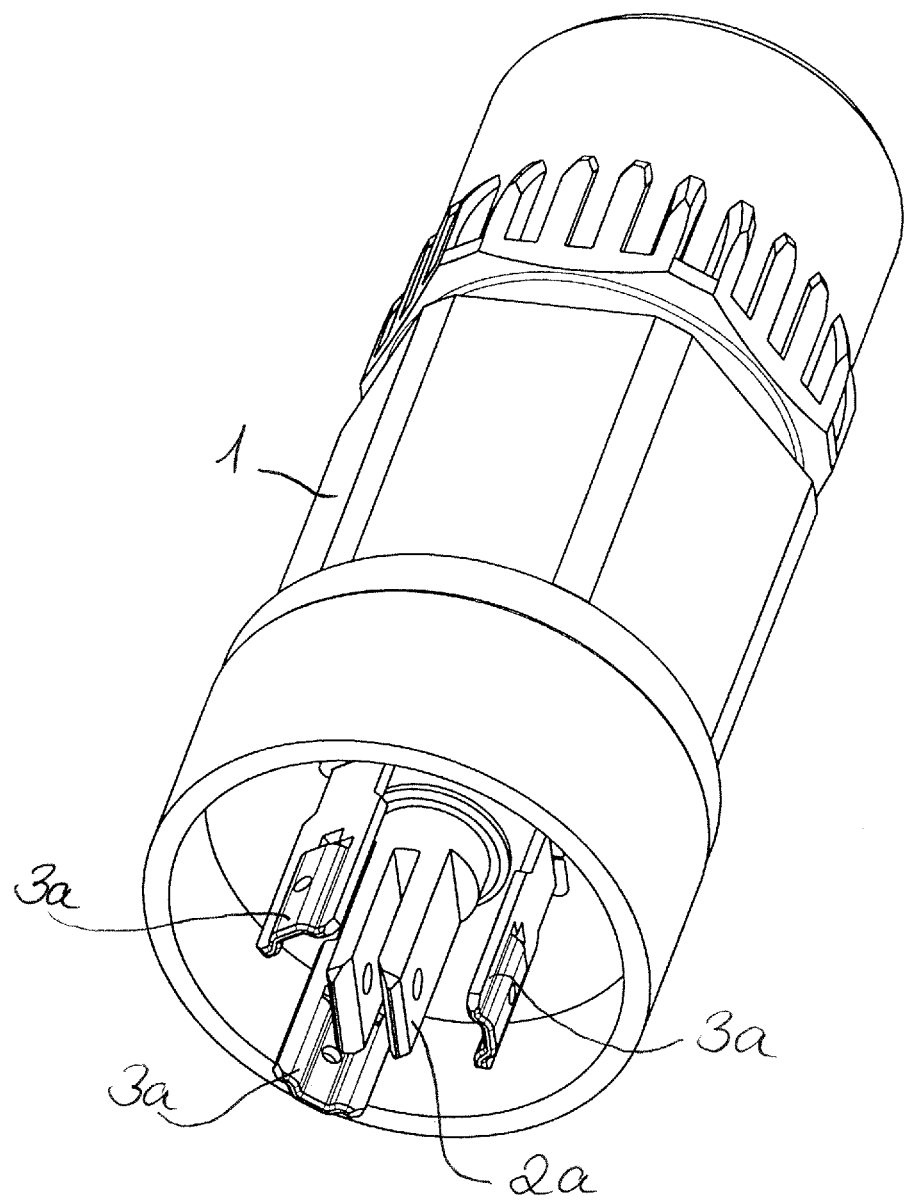
FIG. 1 shows a glow plug connector.
Figure 2:
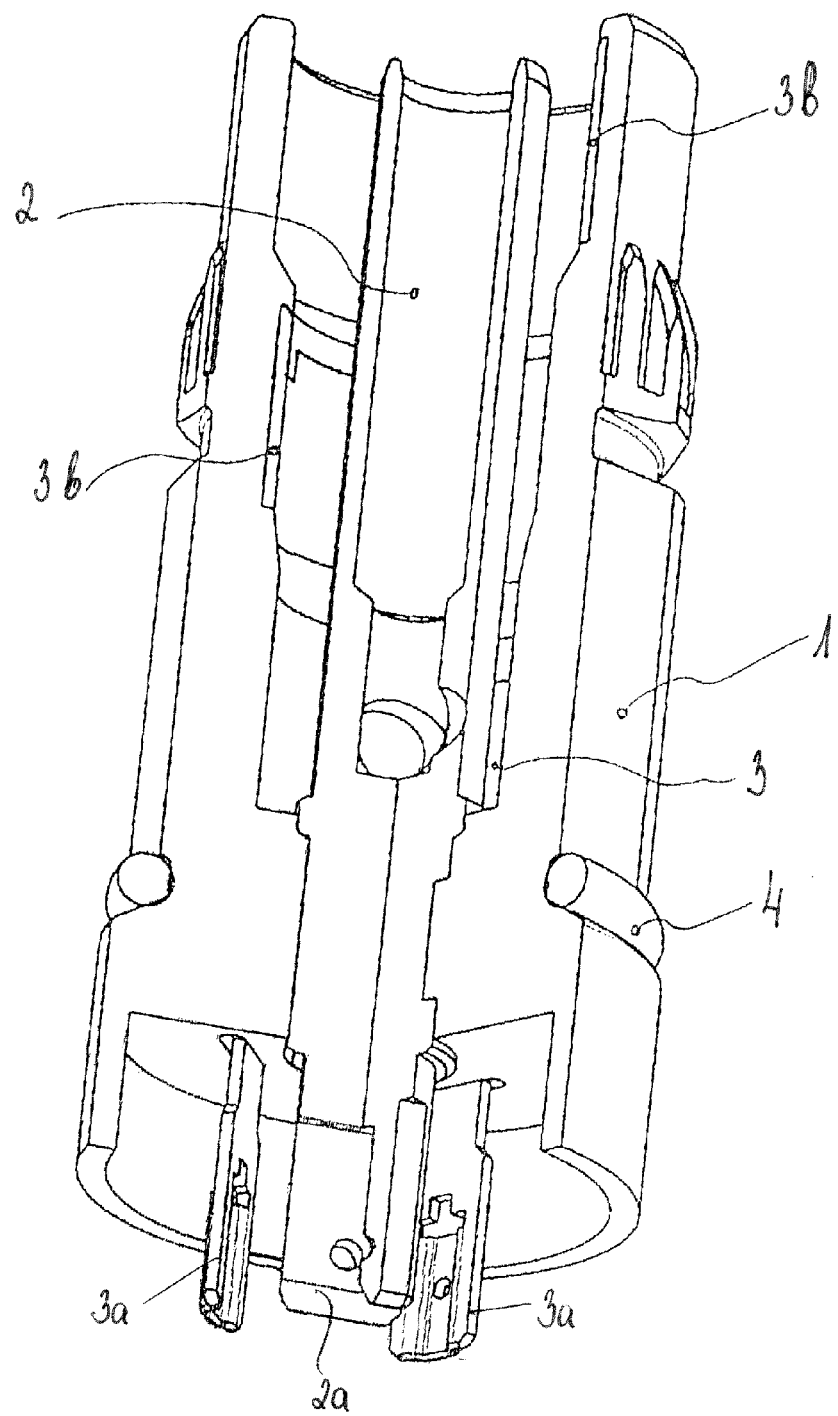
FIG. 2 shows the glow plug connector in a partial sectional view.

The glow plug connector shown in FIGS. 1 and 2 is provided for installation on a sensor glow plug, that is, on a glow plug comprising a sensor, for example a pressure sensor. Such a glow plug that has a sensor for measuring combustion chamber pressure is a cylinder pressure sensor. The glow plug connector has a housing 1 made of plastic and is preferably sleeve-shaped. As shown in FIG. 1, a circumferential wall of the housing 1 encloses a high-current connection 2, which is preferably embodied as a stud and is used to conduct the heating current required by a glow plug.

The high-current connection 2, which is preferably disposed centrally in the housing, comprises an end section 2a that protrudes out of the base of the housing 1. The end section 2a may be slotted. When the glow plug connector is mounted on a glow plug, the end section 2a of the high-current connection is electrically connected to the inner pole of the glow plug, for example by welding.

For the purpose of contacting the individual connections of the sensor of a sensor glow plug, end sections 3a of contact elements 3 protrude from the base of the housing 1, said end sections being connected during assembly of the connector, for example by welding, to a glow plug having matching connections of a sensor. Preferably, exactly three contact elements 3 are present, for example to connect a ground contact, a signal contact and a supply contact of a sensor.

The contact elements 3 made of metal form contact surfaces 3b, which bear against a circumferential wall of the housing 1. In the embodiment shown, the contact surfaces 3b bear internally against the circumferential wall of the housing 1. It is possible, however, to arrange the contact surfaces 3b externally on the circumferential wall of the housing 1.

The contact surfaces 3b are embodied as segments of a circle that protrude in circumferential direction from a strip-shaped section of the contact elements 3 extending in the plug-in direction. The contact surfaces 3b extend perpendicularly to the strip-shaped section of the contact elements 3 extending in the plug-in direction. As measured in the circumferential direction, the segments of a circle 3b therefore have a greater width than the end sections 3a of the contact elements 3 protruding from the base of the housing 1. The contact elements 3 can be produced at low cost from L- or T-shaped sheet-metal strips via bending and can then be embedded in plastic in order to form the housing 1. In the embodiment shown, plastic material of the housing touches and covers a back side of the contact elements and lateral surfaces completely or in part. To this end, the contact elements 3 are placed into an injection mold and the housing 1 is then produced via injection molding. It is also possible, however, to initially produce the housing 1 without the contact elements and only later fasten them in the housing, for example by way of insertion, locking into place, pressing in, gluing in place or the like.

In the embodiment shown, the contact surfaces 3b are disposed at different distances from the base of the housing 1. The contact surfaces 3b each extend in the circumferential direction across an angular range of 60° to 180°, for example an angular range of 90° to 180°. The contact surfaces 3b are disposed one behind the other in the plug-in direction, although preferably at different angles of rotation relative to the longitudinal axis of the housing 1. In the embodiment shown, a contact surface 3b extends across an angular range of 60° to 80°, preferably 60° to 70°, a contact surface 3b extends across an angular range of 90° to 110°, for example 90° to 100°, and a third contact surface 3b extends across an angular range of 130° to 150°, for example 130° to 140°. The first contact surface mentioned is provided for a ground contact, the second contact surface mentioned is provided for a signal contact, and the final contact surface mentioned is provided for contact to the supply voltage.

Figure 3:
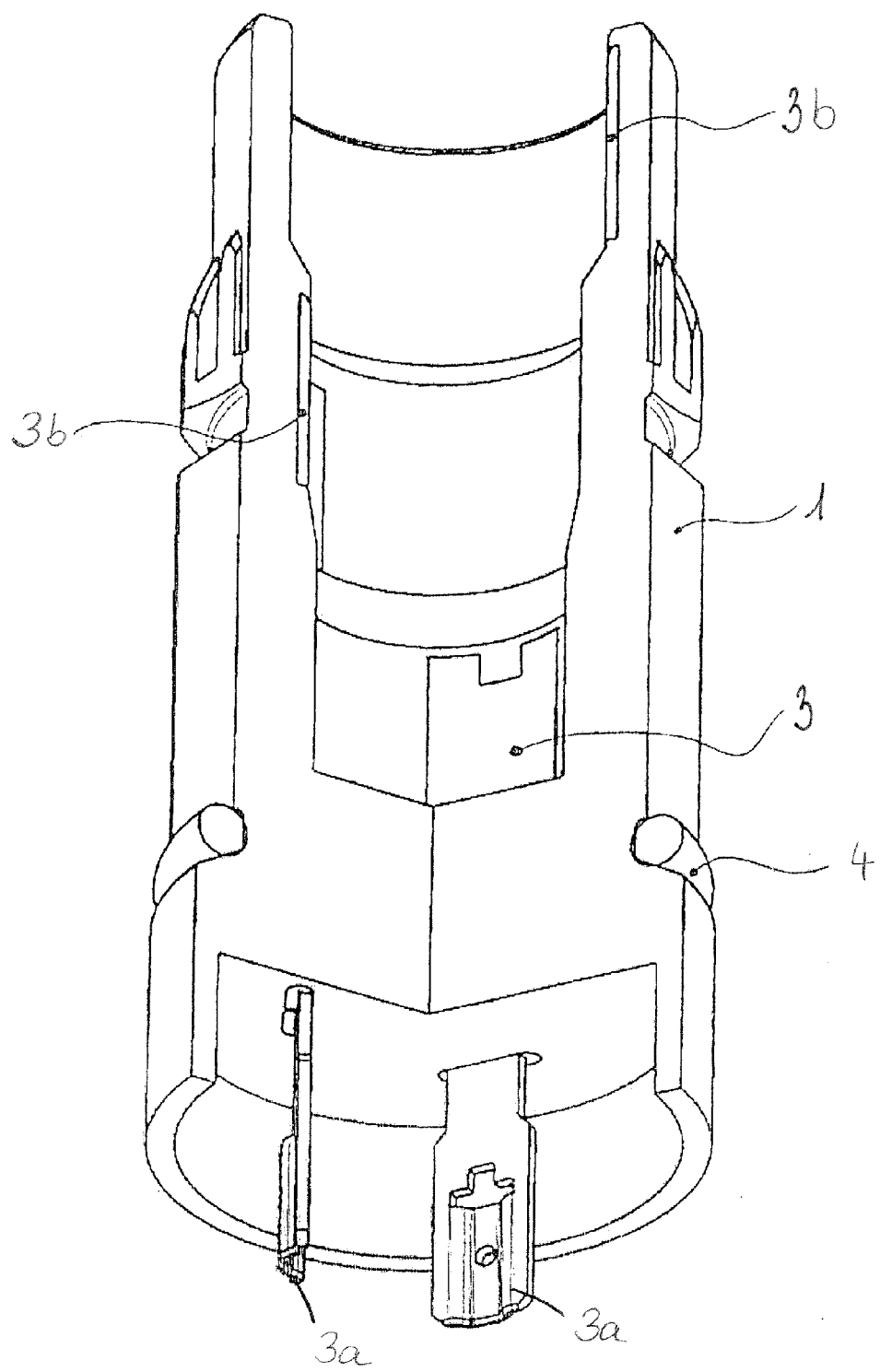
FIG. 3 shows a connector for a cylinder pressure sensor in a partial sectional view.

FIG. 3 shows a connector for a cylinder pressure sensor for measuring the pressure in a combustion chamber of an internal combustion engine. This connector differs from the glow plug connection shown in FIG. 1 substantially only in that the high-current connector 2 is omitted. A high-current connector is not required for a cylinder pressure sensor. A stud can be disposed centrally in the housing as a mechanical guide, however, even in a connector for a cylinder pressure sensor. The mechanical guide can be formed by a stud inserted into the housing or this can be an integral component of the housing. Since the stud is used only as a mechanical guide, it can be made of metal, although this is not necessary. A connector for a sensor glow plug can therefore basically also be used as a connector for a cylinder pressure sensor that is not a glow plug.

The housing 1 of the connector for a cylinder pressure sensor can also comprise—as is the case with the housing 1 of the glow plug connector—a seal 4, for example an O-ring, in order to protect the electrical contacts against environmental influences. By way of such a seal 4, the connector can be sealed with respect to a glow plug housing or a sensor housing or with respect to a plugged-in mating connector. The housing 1 of the connector can also have a sealing surface that seals in conjunction with an O-ring of a mating connector.

While exemplary embodiments incorporating the principles of the present invention have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A connector for a cylinder pressure sensor for measuring the pressure in a combustion chamber of an internal combustion engine, comprising:
   a housing made of plastic;
   a plurality of contact elements made of metal, the contact elements each having two opposing surfaces, the two opposing surfaces being aligned with respect to a plug-in direction of the glow plug, one of the opposing surfaces comprising a contact surface bearing against a circumferential wall of the housing and the other opposing surface comprising an electrical contact surface adapted for electrical connection with a mating connector;

wherein the contact elements protrude from a base of the housing and wherein the contact surfaces are formed as segments of a circle and protrude in circumferential direction from a strip-shaped section of the contact elements, the contact surfaces having a curvature that matches the curvature of the circumferential wall.

2. A glow plug connector for a sensor glow plug, comprising:

a housing made of plastic; and a plurality of contact elements made of metal, the contact elements each having two directly opposing surfaces, one of the opposing surfaces comprising a contact surface bearing against a circumferential wall of the housing and the other opposing surface comprising an electrical contact surface adapted for electrical connection with a mating connector;

wherein the contact elements protrude on a glow-plug side from a base of the housing and wherein the contact surfaces are formed as segments of a circle and protrude from a strip-shaped section of the contact elements, the contact surfaces having a curvature that matches the curvature of the circumferential wall.

3. The glow plug connector according to claim 2, wherein the segments of a circle each extend in the circumferential direction across an angular range that does not exceed 180°.

4. The glow plug connector according to claim 2, wherein the segments of a circle each extend in the circumferential direction across an angular range of at least 60°.

5. The glow plug connector according to claim 2, wherein the contact surfaces are disposed at different distances from the base of the housing.

6. The glow plug connector according to claim 2, wherein one of the segments of a circle has a greater width, as measured in the circumferential direction, than one of the other segments of a circle.

7. The glow plug connector according to claim 2, wherein the width of the largest segment of a circle, as measured in the circumferential direction, is larger by at least one-third than the width of the smallest segment of a circle as measured in the circumferential direction.

8. The glow plug connector according to claim 2, wherein the width of the largest segment of a circle, as measured in the circumferential direction, is at least one and a half times the width of the smallest segment of a circle as measured in the circumferential direction.

9. The glow plug connector according to claim 2, wherein the contact surfaces bear internally against the circumferential wall of the housing.

10. The glow plug connector according to claim 2, wherein the contact surfaces are embedded in a circumferential wall of the housing.

11. The glow plug connector according to claim 2, wherein the circumferential wall encloses a high-current connection for the glow current of a glow plug.

12. The glow plug connector according to claim 2, wherein the contact elements, which provide the contact surfaces bearing against the circumferential wall of the housing, are embedded into the housing.

13. The glow plug connector according to claim 2, wherein one of the segments of a circle extends across an angular range of 60° to 80°, one of the segments of a circle extends across an angular range of 90° to 110°, and one of the segments of a circle extends across an angular range of 130° to 150°.

14. A sensor glow plug comprising a glow plug connector according to claim 2, wherein the contact elements protruding from the base of the housing are connected to leads of a sensor of the sensor glow plug.

\* \* \* \* \*